US011403607B1

(12) United States Patent
Fontana et al.

(10) Patent No.: US 11,403,607 B1
(45) Date of Patent: Aug. 2, 2022

(54) SYSTEMS AND METHODS FOR INTER-FINANCIAL INSTITUTION DEPOSITS AT AN ATM

(71) Applicant: Wells Fargo Bank, N.A., San Francisco, CA (US)

(72) Inventors: Laura Marie Fontana, San Francisco, CA (US); Margot Lockwood-Stein, Palo Alto, CA (US); Michael R. Thomas, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 720 days.

(21) Appl. No.: 15/392,853

(22) Filed: Dec. 28, 2016

(51) Int. Cl.
  *G06Q 20/10* (2012.01)
  *G07F 19/00* (2006.01)
  *G06Q 20/40* (2012.01)

(52) U.S. Cl.
  CPC ..... *G06Q 20/1085* (2013.01); *G06Q 20/4014* (2013.01); *G07F 19/202* (2013.01); *G07F 19/203* (2013.01)

(58) Field of Classification Search
  CPC .................................... G06Q 20/1085
  USPC ..................................... 705/43, 44
  See application file for complete search history.

(56) References Cited

U.S. PATENT DOCUMENTS

| 7,665,657 | B2 | 2/2010 | Huh |
| 8,020,757 | B2 | 9/2011 | Gardner |
| 8,301,565 | B2 | 10/2012 | Cantley et al. |
| 8,725,641 | B2 | 5/2014 | Bachrany et al. |
| 2003/0080185 | A1 | 5/2003 | Werther |
| 2008/0288400 | A1 | 11/2008 | Panthaki et al. |
| 2008/0313087 | A1 | 12/2008 | Joseph et al. |
| 2010/0030687 | A1 | 2/2010 | Panthaki et al. |
| 2011/0055083 | A1 | 3/2011 | Grinhute |
| 2011/0137795 | A1* | 6/2011 | Nambiar ............ G06Q 20/40 235/379 |
| 2014/0052625 | A1 | 2/2014 | Sorbe et al. |

* cited by examiner

*Primary Examiner* — Cho Kwong
(74) *Attorney, Agent, or Firm* — Foley & Lardner LLP

(57) ABSTRACT

Systems, methods, and apparatuses using a financial institution computing system associated with a first financial institution includes a processing circuit including a processor and memory, the memory structured to store instructions that are executable by the processor and cause the processing circuit to receive a user identification associated with a user. The user holds a first account at the first financial institution and a second account at a second financial institution, where the first financial institution is different than the second financial institution. The processing circuit is further configured to authenticate the user using the user identification compared to a stored user profile in an accounts database held at the first financial institution, receive, from an ATM associated with the first financial institution, a selection option indicating the user is depositing an amount of funds into the second account at the second financial institution, receive, from the ATM, an indication that a payment source for the amount of funds was received at the ATM, and initiate a transfer of the amount of funds from the first financial institution to the second account at the second financial institution.

14 Claims, 6 Drawing Sheets

US 11,403,607 B1

SYSTEMS AND METHODS FOR INTER-FINANCIAL INSTITUTION DEPOSITS AT AN ATM

TECHNICAL FIELD

Embodiments of the present disclosure relate generally to the field of financial transactions facilitated at automated teller machines.

BACKGROUND

The present invention relates generally to the field of financial deposit transactions. To conduct a deposit into a financial account, an individual must visit the location of the financial institution holding the account or visit an automated teller machine (ATM) of the financial institution. Many times, individuals hold accounts at two or more financial institutions and may desire to make deposits to each account they hold. Conventionally, to make a deposit at two financial institutions, an individual must separately travel to locations of both the first financial institution and the second financial institution to make the two different deposits. Travelling to two or more financial institutions, or ATMs, may take a significant amount of time.

SUMMARY

A first example embodiment relates to a system. The system includes a financial institution computing system associated with a first financial institution. The system further includes a processing circuit comprising a processor and memory, the memory structured to store instructions that are executable by the processor and cause the processing circuit to receive a user identification associated with a user. The user holds a first account at the first financial institution and a second account at a second financial institution, where the first financial institution is different than the second financial institution. The processing circuit is further caused to authenticate the user using the user identification, where the user identification is compared to a stored user profile in an accounts database held at the first financial institution, and receive, from an automated teller machine (ATM) associated with the first financial institution, a selection option indicating the user is depositing an amount of funds into the second account at the second financial institution. The processing circuit is further caused to receive, from the ATM, an indication that a payment source for the amount of funds was received at the ATM and initiate a transfer of the amount of funds from the first financial institution to the second account at the second financial institution.

Another example embodiment relates to a method. The method includes receiving, by a first financial institution computing system, a user identification associated with a user. The user holds a first account at a first financial institution and a second account at a second financial institution. The method further includes authenticating the user using the user identification, where the user identification is compared to a stored user profile in an accounts database held at the first financial institution and receiving a selection option indicating the user is depositing into a second account, where the selection option is received from an ATM of the first financial institution. The method further includes receiving, from the ATM, an indication that a payment source for the amount of funds was received at the ATM, and initiating, by the first financial institution computing system, a transfer of the amount of funds to the second account.

A further example embodiment relates to an apparatus. The apparatus includes an authentication circuit configured to receive a user identification associated with a user, wherein the user holds a first account at a first financial institution and authenticate the user using the user identification, wherein the user identification is compared to a stored user profile in an accounts database held at the first financial institution. The apparatus further includes a deposit processing circuit configured to receive a selection option indicating the user is depositing into a second account, wherein the user holds the second account at a second financial institution and wherein the selection option is received from an automated teller machine (ATM) of the first financial institution, receive, from the ATM, an indication that a payment source for the amount of funds was received at the ATM, and a transfer processing circuit configured to initiate a transfer of the amount of funds to the second account.

These and other features, together with the organization and manner of operation thereof, will become apparent from the following detailed description when taken in conjunction with the accompanying drawings.

DETAILED DESCRIPTION

Figure 1:
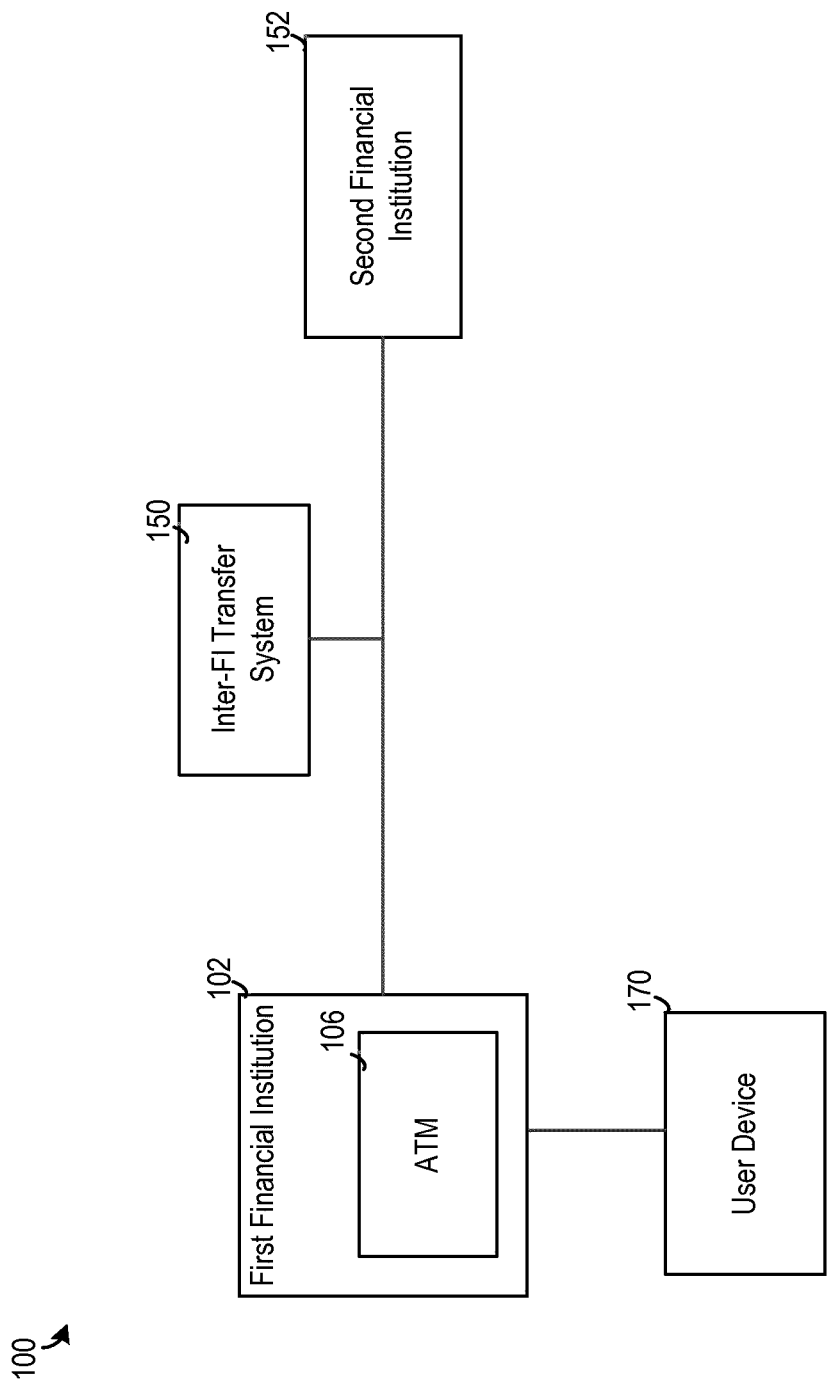
FIG. 1 is an environment view of an inter-financial institution (inter-FI) deposit system, according to an example embodiment.

Referring to the Figures generally, various systems, methods, and apparatuses for managing deposit transactions are described herein. More particularly, systems and methods for facilitating inter-FI deposits (i.e., a deposit in which funds are received at a first financial institution and are deposited into an account maintained at a second financial institution) are described herein.

According to various example embodiments, as described in further detail below, facilitating deposits into an account at a second financial institution from an ATM of a first financial institution may save a user time when desiring to make a deposit into an account of another financial institution and/or make deposits into two different financial institution accounts during the same ATM interaction. Unlike conventional deposits, the user does not have to travel to a second financial institution and/or an ATM of the second financial institution to make a deposit to an account held at the second financial institution. Instead, using the systems and methods described herein, the user can conveniently make deposits to accounts held at both the first financial institution and the second financial institution at an ATM of the first financial institution. Beneficially, these systems and methods cut down on travel time for the user by allowing the user to make deposits to two (or more) different accounts each held at different financial institutions in a single ATM interaction instance.

An example implementation may be described as follows. The user holds a checking account at a first financial institution and a savings account at a second financial institution. The user visits an ATM of the first financial institution and inserts a debit card into the ATM. The user is authenticated by entering a personal identification number (PIN) into the ATM. The user selects a "deposit cash" selection on the user interface of the ATM. The user is then prompted by the ATM to select the account to which the user desires to deposit the cash. The user selects an "other financial institution savings account" selection. The ATM then prompts the user to insert the cash into a deposit mechanism of the ATM. Once the user inserts the cash, the ATM determines the amount of the cash and relays this information to the financial institution computing system associated with the first financial institution. The financial institution computing system may update (e.g., temporarily update) an account of the user held at the first financial institution to show an indication of the deposit. Concurrently or immediately thereafter, the financial institution initiates a transfer (e.g., via an inter-FI transfer system) to the second financial institution such that the amount is deposited into the user's savings account at the second financial institution. The inter-FI transfer system completes the transfer. The first financial institution receives a deposit verification from the second financial institution and displays the notification of success to the user via the ATM screen.

In operation, the deposit management system facilitates the deposit of cash and/or checks into an account held at a second financial institution (e.g., second financial institution 152 in FIG. 1) from an ATM associated with a first financial institution (e.g., first financial institution 102 in FIG. 1). When a user deposits cash and/or checks into an ATM of a first financial institution and indicates that the deposit is for an account at a second institution, the system proceeds to complete the deposit into the account of the first financial institution and immediately transfer the funds to the second financial institution. In some arrangements, the deposit into the second financial institution (e.g., as viewed from the user's perspective) occurs in real-time or near real-time. Other embodiments may include different arrangements and displays without departing from the spirit and scope of the present disclosure.

Referring now to FIG. 1, an environment view of an inter-FI deposit system 100 is shown, according to an example embodiment. As described in further detail below, the system 100 facilitates deposit management between two (or more) financial institutions (e.g., first financial institution 102 and second financial institution 152). Specifically, the system 100 facilitates the deposit and near-simultaneous transfer of funds from a first financial institution 102 to a second financial institution 152. As described further herein, the funds transfer between the financial institutions 102, 152 can be completed through an inter-FI transfer system 150, such as an automated clearing house (ACH) system, a wire transfer system, a real-time transfer system, or the like. As used herein, "other financial institution" or "second financial institution" refers to a financial institution holding the account into which the user wishes to deposit money. In some arrangements, the second financial institution 152 may enter into an agreement with the financial institution 102 to utilize the system 100 such that users may directly deposit money into accounts held at the second financial institution 152 using an ATM associated with the first financial institution 102. In some arrangements, the first financial institution 102 and the second financial institution 152 enter into agreements with the inter-FI transfer system 150 to facilitate such transactions. As such, the user can deposit money into the account held at the second financial institution 152 without visiting the second financial institution 152 and/or an ATM of the second financial institution 152.

Figure 2:
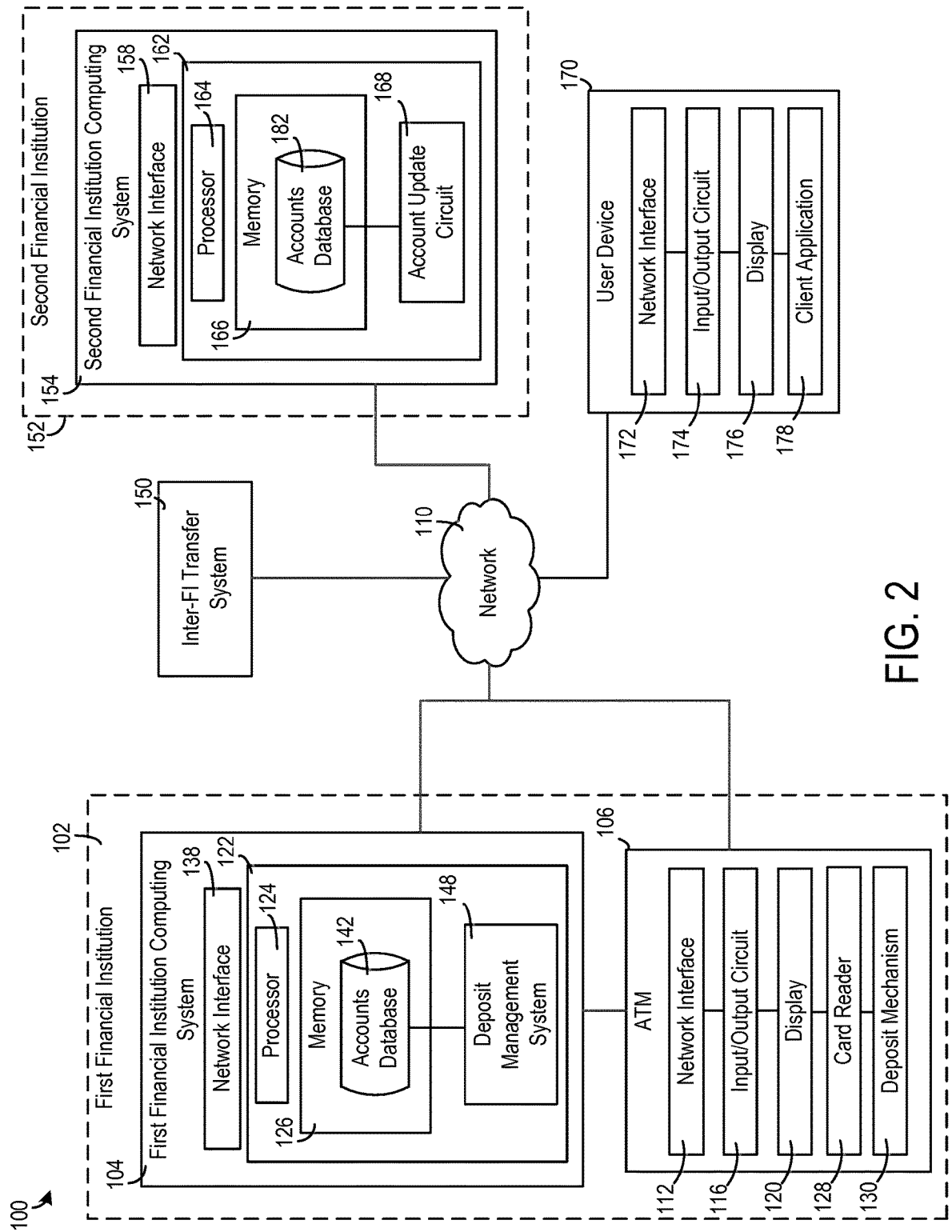
FIG. 2 is a detailed schematic diagram of the system of FIG. 1, according to an example embodiment.

Referring to FIG. 2, the system 100 includes a first financial institution computing system 104 associated with a first financial institution 102, where the first financial institution computing system 104 is communicably and operatively coupled to an ATM 106, user device 170, inter-FI transfer system 150, and a second financial institution computing system 154 over a network 110. The network 110 provides communicable and operative coupling between the user device 170, the ATM 106, the first financial institution computing system 104, the inter-FI transfer system 150, the second financial institution computing system 154, and other components disclosed and described herein to provide and facilitate the exchange of communications (e.g., data, instructions, messages, values, commands, etc.) Accordingly, the network 110 may include any network including wired (e.g., Ethernet) and/or wireless networks (e.g., 802.11X, ZigBee, Bluetooth, WiFi, etc.). In some arrangements, the network 110 includes the Internet. In further embodiments, the network 110 includes a proprietary banking network to provide secure or substantially secure communications.

The ATM 106 includes any type of computing device capable of both receiving deposits and dispensing funds. In some embodiments, the ATM 106 is operated by the first financial institution 102. The ATM 106 is configured to receive a transaction card (e.g., debit card, credit card) from a user and complete various financial transactions for the user including a cash deposit, a check deposit, a cash withdrawal, a transfer of funds, check account balances, etc. The ATM 106 is configured to communicate with the first financial institution computing system 104 to complete these various financial transactions. In this regard, the ATM 106 is communicably and operatively coupled to the first financial institution computing system 104.

The ATM 106 includes a display 120, an input/output (I/O) circuit 116, a card reader 128, a deposit mechanism 130, and a network interface 112. In some arrangements, the ATM 106 includes additional components, such as a receipt printer, a currency (i.e., bill) transport system, a secure storage (for bills/checks), and/or a cash dispensing mechanism. The network interface 112 of the ATM 106 is adapted for and configured to establish a communication session via the network 110 with the first financial institution computing system 104. Accordingly, the network interface 112 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver). In some embodiments, the network interface 112 communicates via a secured wired connection within a branch of the financial institution 102.

The display 120 is structured and configured to present account information, transaction information, transaction options, transaction confirmations, and the like to users on the ATM 106. In this regard, the display 120 is communicably and operatively coupled to the input/output circuit 116 to provide a user interface for receiving and displaying information on the ATM 106. Examples of user interfaces are described more fully herein with regard to FIGS. 6 and 7.

The input/output circuit 116 is structured to receive and provide communication(s) to a user of the ATM 106. In this regard, the input/output circuit 116 is structured to exchange data, communications, instructions, etc., with an input/output component of the ATM 106. Accordingly, in one embodiment, the input/output circuit 116 includes an input/output device such as a display device, a touchscreen, a keyboard, a near-field communication (NFC) transceiver, and/or a microphone. In another embodiment, the input/output circuit 116 may include communication circuitry for facilitating the exchange of data, values, messages, and the like between an input/output device and the components of the ATM 106. In yet another embodiment, the input/output circuit 116 may include machine-readable media for facilitating the exchange of information between the input/output device and the components of the ATM 106. In still another embodiment, the input/output circuit 116 may include any combination of hardware components (e.g., a touchscreen), communication circuitry, and machine-readable media.

The card reader 128 is configured to read the transaction card provided to the ATM 106 by the user. The transaction card provided to the ATM 106 may be associated with one or more accounts at the first financial institution 102. For example, the transaction card can be a debit card associated with a checking account at the first financial institution 102. As a further example, the transaction card can be a credit card associated with a credit account at the first financial institution 102. In one embodiment, the card reader 128 reads the transaction card through a user swiping action. For example, the user swipes a transaction card by passing the magnetic strip of the card through the card reader 128. In another embodiment, the card reader 128 reads the transaction card through a user dipping action. For example, the user dips the transaction card by quickly inserting and removing the transaction card from the card reader 128. In another embodiment, the card reader is configured to read the transaction card through a user inserting action. For example, the user inserts the transaction card fully into the card reader 128 and the card remains inserted into the card reader 128 for the duration of the transaction sequence at the ATM 106. In instances where the transaction card includes a smart chip, the user may be prompted to insert the card such that the card reader 128 can make contact with the smart chip for a period of time to read the smart chip. In some arrangements, the card reader 128 includes an NFC transceiver configured to receive transaction card information (e.g., a payment token) from a mobile device (e.g., a smartphone).

The card reader 128 transmits the transaction card information to the first financial institution computing system 104 and is configured to receive an authentication prompt from the first financial institution computing system 104 to be displayed (e.g., via display 120) on the ATM 106. For example, the first financial institution computing system 104 transmits an authentication prompt including a request for PIN from the user. Once the card is authenticated, the user is authorized to complete transactions at the ATM 106 using the transaction card, as described further herein.

The deposit mechanism 130 is structured to receive, scan, and authenticate cash and/or checks from a user interacting with the ATM 106, determine the deposit amount, determine the payee of funds if receiving a check, and transmit the deposit type, amount, and other deposit information to the first financial institution computing system 104. Accordingly, the deposit mechanism 130 is communicably and operatively coupled to the first financial institution computing system 104 to transmit information regarding deposit types and amounts. The deposit mechanism 130 includes a counting device such that when receiving a deposit, the deposit mechanism 130 can count the number of bills or checks and additionally verify that the currency is legitimate using a scanner. In some arrangements, the deposit mechanism 130 scans the image of a check being deposited into the ATM 106 to identify the payor and payee information, the amount of deposit, etc. The deposit mechanism 130 can store the scanned image in the accounts database 142 for later access by the first financial institution computing system 104. The deposit mechanism 130 may be further structured to communicate the scanned image, deposit amount, type (e.g., check or cash), and payor/payee details to the display 120 of the ATM 106 such that the information is displayed to the user on the ATM 106 for confirmation.

The system 100 further includes a second financial institution computing system 154. As shown, the second financial institution computing system 154 includes a processing circuit 162 having a processor 164 and a memory 166. The processor 164 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 166 (e.g., RAM, NVRAM, ROM, Flash Memory, hard disk storage, etc.) may store data and/or computer code for facilitating the various processes described herein. Moreover, the one or more memory devices 166 may be or include tangible, non-transient volatile memory or non-volatile memory. Accordingly, the one or more memory devices 166 may include database components, object code components, script components, or any other type of information structure for supporting the various activities and information structures described herein.

The second financial institution computing system 154 further includes an accounts database 182, an account update circuit 168, and a network interface 158. The network interface 158 is adapted for and configured to establish a communication session via the network 110 with the first financial institution computing system 104 and inter-FI transfer system 150. Accordingly, the network interface 158 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver). In some embodiments, the network interface 158 communicates via a secured wired connection within a branch of the second financial institution 152.

The accounts database 182 is configured to hold, store, categorize, and otherwise serve as a repository for information associated with accounts held by the second financial institution 152. For example, the accounts database 182 may store account numbers, account balances, account ownership information, and the like. The accounts database 182 may further store information regarding accounts held at the financial institution 102 that are associated with the user and/or accounts of the user at the second financial institution 152. The accounts database 182 is structured to selectively provide access to information relating to an account at the second financial institution 152. Although shown as being part of the memory 166, in some arrangements, the accounts database 182 is a separate component of the second financial institution computing system 154.

The account update circuit 168 is configured to update an account of the user at the second financial institution 152. As such, the account update circuit 168 is communicably and operatively coupled to the accounts database 182 to update accounts stored in the accounts database 182 to reflect deposits received from the user via an ATM 106 associated with the first financial institution 102. In one arrangement, the account update circuit 168 is further structured to receive a deposit indication from the first financial institution computing system 104. In another arrangement, the account update circuit 168 is structured to receive a deposit indication from the inter-FI transfer system 150. In other arrangements, the account update circuit 168 is structured to receive a deposit indication from both the first financial institution computing system 104 and inter-FI transfer system 150. Once a user makes a deposit at the ATM 106, the first financial institution computing system 104 updates the user account at the first financial institution 102 to reflect the deposit (e.g., temporarily updates the account to reflect the transaction is processing) and immediately completes a funds transfer process to the second financial institution 152 (e.g., via the inter-FI transfer system 150). The account update circuit 168 receives the indication of funds deposited at the ATM 106 and updates the accounts database 182 to reflect the deposit (e.g., the funds transfer from the first financial institution 102). Although shown as being part of the processing circuit 162, the account update circuit 168 may be a stand-alone circuit having its own processor and memory.

The user device 170 includes any type of computing device that may be used to facilitate the registration of user accounts held at a second financial institution 152. In some arrangements, the user uses the user device 170 to perform financial transactions. In some arrangements, the user uses the user device 170 to register an account the user holds at a second financial institution 152. The user device 170 may include any wearable and non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. The user device 170 may also include any type of mobile device including, but not limited to, a phone (e.g., smart phone, etc.), and/or any type of computing devices (e.g., desktop computer, laptop computer, personal digital assistant, etc.).

The user device 170 further includes a display 176, an input/output circuit 174, a network interface 172, and a client application 178. The network interface 172 of the user device 170 is adapted for and configured to establish a communication session via the network 110 with the financial institution computing system 104. Accordingly, the network interface 172 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The display 176 is used to present account information, transaction information, and the like. The display 176 is further used to present account registration prompts and confirmations to the user. In this regard, the display 176 is communicably and operatively coupled to the input/output circuit 174 to provide a user interface for receiving and displaying information on the user device 170.

The input/output circuit 174 is structured to receive and provide communication(s) to a user of the user device 170. In this regard, the input/output circuit 174 is structured to exchange data, communications, instructions, etc., with an input/output component of the user device 170. Accordingly, in one embodiment, the input/output circuit 174 includes an input/output device such as a display device, a touchscreen, a keyboard, and a microphone. In another embodiment, the input/output circuit 174 may include communication circuitry for facilitating the exchange of data, values, messages, and the like between an input/output device and the components of the user device 170. In yet another embodiment, the input/output circuit 174 may include machine-readable media for facilitating the exchange of information between the input/output device and the components of the user device 170. In still another embodiment, the input/output circuit 174 may include any combination of hardware components (e.g., a touchscreen), communication circuitry, and machine-readable media.

The client application 178 is communicably coupled to the first financial institution computing system 104 (e.g., the accounts database 142) via the network 110 and may be structured to permit management of the user's accounts via the client application 178. In this regard, the client application 178 may provide displays indicative of current account balances, pending transactions, profile information (e.g., contact information), and the like. Further, in some embodiments, the client application 178 may also permit payments to and/or from the user to a designated recipient. For example, the client application 178 may depict a loan of a customer (e.g., mortgage) and allow the user to pay the mortgage from one of their accounts (e.g., checking or savings). In another example, a bill pay option may be provided by the client application 178, where the bill pay option allows the user to pay his/her bills. In any of these examples, the client application 178 may permit the user to register accounts at a second financial institution 152 for use with the deposit management system 148.

The inter-FI transfer system 150 is used to transmit funds to and from accounts held at the first financial institution 102 and the second financial institution 152. In some arrangements, the inter-FI transfer system 150 is a real-time transfer system. The real-time transfer system facilitates the concurrent transfer of funds into a second financial institution account upon receiving an indication that a customer has deposited funds marked for deposit at the second financial institution account (e.g., via an ATM 106 of the first financial institution 102). In some arrangements, to facilitate a real-time transfer of funds, the inter-FI transfer system 150 is continuously monitoring the first financial institution computing system 104 for indications that funds have been marked for deposit into an account at the second financial institution 152. Accordingly, the inter-FI transfer system 150 may monitor the accounts database 142 of the first financial institution computing system 104 for such updates. In some arrangements, a separate database designated for funds transfers to the second financial institution 152 is continuously updated and monitored by the inter-FI transfer system 150. In other arrangements, the inter-FI transfer system 150 is an ACH system. An ACH Network is a nationwide batch-oriented electronic funds transfer system which provides for interbank clearing of electronic payments for participating depository financial institutions. The ACH system may complete transfers in batches (e.g., daily, bi-daily, etc.) from the first financial institution 102 to the second financial institution 152. In other arrangements, the inter-FI transfer system 150 is a wire transfer system.

Still referring to FIG. 2, the system 100 includes the first financial institution computing system 104. The first financial institution computing system 104 facilitates deposits into accounts held at the second financial institution 152. As shown, financial institution computing system 104 includes a processing circuit 122 having a processor 124 and a memory 126. The processor 124 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 126 (e.g., RAM, NVRAM, ROM, Flash Memory, hard disk storage, etc.) may store data and/or computer code for facilitating the various processes described herein. Moreover, the one or more memory devices 126 may be or include tangible, non-transient volatile memory or non-volatile memory. Accordingly, the one or more memory devices 126 may include database components, object code components, script components, or any other type of information structure for supporting the various activities and information structures described herein.

The first financial institution computing system 104 further includes a network interface 138, which is used to establish connections with other components of the system 100 by way of network 110. The network interface 138 includes program logic that facilitates connection of the financial institution computing system 104 to the network 110. The network interface 138 supports communication between the first financial institution computing system 104 and other systems, such as the ATM 106, the second financial institution computing system 154, and the user device 170. For example, the network interface 138 includes a cellular modem, a Bluetooth transceiver, a Bluetooth beacon, a radio-frequency identification (RFID) transceiver, and a near-field communication (NFC) transmitter. In some embodiments, the network interface 138 communicates via a secured wired connection within a branch of the first financial institution 102. In some arrangements, the network interface 138 includes the hardware and machine-readable media sufficient to support communication over multiple channels of data communication. Further, in some arrangements, the network interface 138 includes cryptography capabilities to establish a secure or relatively secure communication session with the first financial institution computing system 104, second financial institution computing system 154, inter-FI transfer system 150, and ATM 106. In this regard, financial data (or other types of data) may be encrypted and transmitted to prevent or substantially prevent the threat of hacking.

The first financial institution computing system 104 further includes an accounts database 142. The accounts database 142 is configured to hold, store, categorize, and otherwise serve as a repository for information associated with accounts held by the first financial institution 102. For example, the accounts database 142 may store account numbers, account balances, account ownership information, and the like. The accounts database 142 may further store information regarding registered accounts at the second financial institution 152 that are associated with the user and/or accounts of the user at the first financial institution 102. The accounts database 142 is structured to selectively provide access to information relating to an account at the first financial institution 102. In this regard, as discussed further herein, the accounts database 142 is communicably and operatively coupled to the deposit management system 148 to provide access to such information, such that the deposit management system 148 may facilitate real-time deposits at the second financial institution 152.

The first financial institution computing system 104 includes a deposit management system 148 for managing a deposit into an account at the second financial institution 152. The deposit management system 148 is structured to register accounts of the second financial institution 152, authenticate the user, process a deposit from the user into a registered account at the second financial institution 152, verify the deposit, and generate and transmit a message for display to the ATM 106 reflecting a deposit confirmation.

Figure 3:
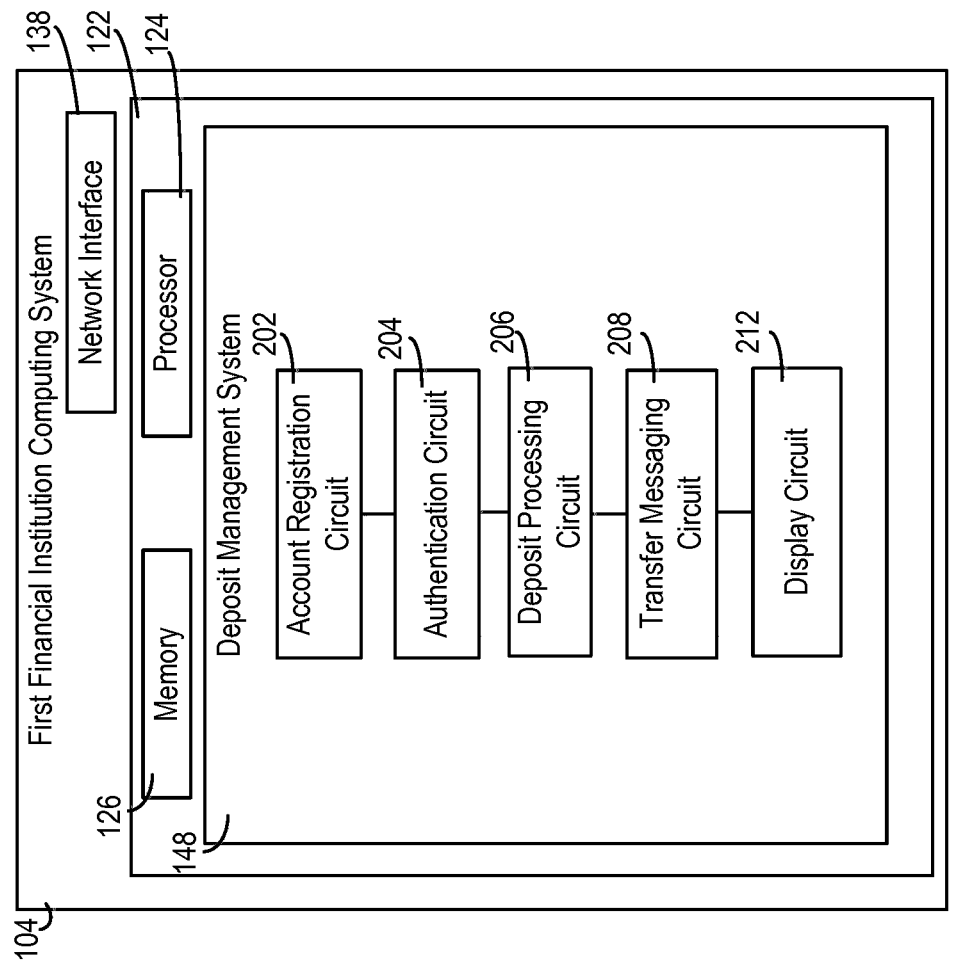
FIG. 3 is a detailed schematic diagram of the first financial institution computing system of FIG. 1, according to an example embodiment.

Referring now to FIG. 3, a diagram of the deposit management system 148 and part of the first financial institution computing system 104 is shown, according to an example embodiment. The deposit management system 148 is shown to include an account registration circuit 202, an authentication circuit 204, a deposit processing circuit 206, a verification circuit 208, a transfer messaging circuit 210, and a display circuit 212, with all such circuits communicably coupled to each other. Other embodiments may include less or more circuits without departing from the spirit and scope of the present disclosure. Further, some embodiments may combine the activities of one circuit with another circuit to form a single circuit. Therefore, those of ordinary skill in the art will appreciate that the present arrangement is not meant to be limiting. Although shown as being part of the processing circuit 122, the deposit management system 148 may be a stand-alone circuit having its own processor and memory.

The account registration circuit 202 is configured to register an account held at the second financial institution 152 for use with the deposit management system 148. The account registration circuit 202 receives an account registration request from a user device 170 (e.g., via the client application 178). In some arrangements, the account registration request is initiated by a user of the user device 170 in the client application 178. For example, the user opens and logs into the client application 178 on the user device 170 and submits a request for registration, including the name of the second financial institution 152, an account number, and a routing number (e.g., ACH routing number). Once the user submits the request, the request is transmitted from the user device 170 to the account registration circuit 202 for processing.

The account registration circuit 202 is configured to verify the account information with the second financial institution 152 such that a deposit transaction using the system 148 can be completed successfully. The account registration circuit 202 transmits a message to the second financial institution 152 requesting verification of the account information. The account information can include an account number, routing number, user name, address, email address, phone number, etc. In another arrangement, the account can be verified by an attempt to transfer a nominal amount of funds (e.g., $0.01) to the account at the second financial institution 152. The account registration circuit 202 communicates with the transfer processing circuit 208 to perform a nominal funds transfer to the second financial institution account. Accordingly, the account registration circuit 202 is communicably and operatively coupled to the transfer processing circuit 208. If the transfer is successful, the transfer processing circuit 208 receives a confirmation message indicating the transfer was processed (e.g., via the inter-FI transfer system 150) and communicates the confirmation message to the account registration circuit 202 to verify the account.

Upon verification of the user, the account registration circuit 202 is further structured to store the registered account information in the accounts database 142. As such, the account registration circuit 202 is communicably and operatively coupled to the accounts database 142 to update such information for access by the system 148 during a deposit and/or transfer process. The account registration circuit 202 may link and/or associate the registered account of the user at the second financial institution 152 with accounts the user holds at the financial institution 102. For example, a user's savings account at a second financial institution 152 is associated with a user's checking account at the financial institution 102. The association of accounts in the accounts database 142 may facilitate smoother transaction processes. For example, a user deposits funds into the ATM 106, the first financial institution computing system 104 (e.g., via the deposit processing circuit 206) deposits the funds into the account held at the first financial institution 102, and then completes a transfer of funds to the account held at the second financial institution 152. If the transfer is unsuccessful for any reason, the funds will still be available to the user in the account held at the first financial institution 102. A funds transfer may be attempted again after a previous unsuccessful attempt.

The authentication circuit 204 is configured to authenticate a user at an ATM 106. The authentication circuit 204 receives transaction card information from the card reader 128 of the ATM 106, generates and transmits an authentication prompt to the ATM 106 (e.g., display 120), and receives a user authentication (e.g., PIN) from the ATM 106. The authentication circuit 204 uses the received user authentication to authenticate the user for use of the ATM 106. The authentication circuit 204 retrieves a user profile from the accounts database 142 and compares the user profile information to the received user authentication to authenticate the user. As such, the authentication circuit 204 is communicably and operatively coupled to the accounts database 142 to complete the authentication. For example, the authentication circuit 204 receives the transaction card information, retrieves the user profile related to the transaction card information from the accounts database 142, and uses the user profile to compare a PIN input by the user at the ATM 106 to a PIN associated with the transaction card in the accounts database 142.

In some arrangements, the authentication circuit 204 communicates with the display circuit 212 to generate and transmit the authentication prompt message and any confirmation and/or denial of authentication to the display 120 of the ATM 106. For example, when a user is authenticated by the authentication circuit 204 (e.g., a user PIN stored in the accounts database 142 is matched to the input PIN), the authentication generates an authentication confirmation message and transmits the message to the ATM 106 for display on the display 120 via the display circuit 212.

The deposit processing circuit 206 is configured to process the deposit of funds into an account at the first financial institution 102. The deposit processing circuit 206 is further configured to communicate with the transfer processing circuit 208 to initiate a funds transfer to the second financial institution 152. Accordingly, the deposit processing circuit 206 is communicably and operatively coupled to the transfer processing circuit 208. The deposit processing circuit 206 receives an amount and type of deposit indication from the deposit mechanism 130 of the ATM 106. The deposit processing circuit 206 updates the user account at the first financial institution 102 to reflect the deposit amount.

In one arrangement, once the deposit processing circuit 206 receives the deposit indication, the deposit processing circuit 206 deposits the funds into the account held at the financial institution 102 and updates the balance of the account to reflect the deposit. For example, the user deposits $500 into the ATM 106 and indicates that the cash is to be deposited into a second financial institution account. The deposit processing circuit 206 receives the deposit information and updates the account at the first financial institution 102 to reflect the deposit both in the transaction log of the account and in the account balance. In some instances, the deposit processing circuit 206 updates the account balance to include a note that the $500 is not available for spending, but is merely a pending amount that is being transferred to the account with the second financial institution 152.

In another arrangement, the deposit processing circuit 206 updates the account with only the transaction information and does not reflect the deposit in the balance of the account. For example, the user deposits $500 into the ATM 106 of the first financial institution 102 and indicates that the cash is to be deposited into an account at the second financial institution 152. Once the cash is received, the ATM 106 transmits the deposit information to the deposit processing circuit 206. When the deposit information is received, the deposit processing circuit 206 marks the funds for transfer to an account at the second financial institution 152, reflects the deposit in the transaction log of the user account at the financial institution 102, but does not update the balance of the account. The deposit processing circuit 206 communicates the deposit information to the transfer processing circuit 208 to complete the funds transfer to the second financial institution account.

The transfer processing circuit 208 is configured to initiate a funds transfer to a registered account at the second financial institution 152. The transfer processing circuit 208 receives deposit information from the deposit processing circuit 206 and communicates with the inter-FI transfer system 150 to complete the funds transfer. In other arrangements, the transfer processing circuit 208 completes the funds transfer using other clearing systems. The transfer message circuit 208 verifies that the payee account is registered with the first financial institution 102 by retrieving the second financial institution account information from the accounts database 142 and matching the account information to a registered account number stored in the accounts database 142. Accordingly, the transfer processing circuit 208 is communicably and operatively coupled to the deposit processing circuit 206 and the accounts database 142. The transfer processing circuit 208 communicates the payee account number and routing number to the inter-FI transfer system 150 to complete the transfer. The inter-FI transfer system 150 can then process the funds transfer to the second financial institution 152 (e.g., check the available funds at the first financial institution 102 and clear the funds for transfer to the second financial institution 152).

The transfer processing circuit 208 is further configured to receive a confirmation or failed attempt message from the second financial institution 152 and/or the inter-FI transfer system 150 indicating the completion of or unsuccessful attempt at a funds transfer. A failed attempt message may include a reason for the unsuccessful attempt (e.g., payee account no longer active, network connectivity issues, etc.). In some arrangements, the transfer processing circuit 208 differentiates the failed attempt messages that are due to temporary situations that indicate a transfer may be successful with another attempt and the failed attempt messages that are due to permanent situations that indicate the transfer will not be successful no matter how many tries (e.g., the account is no longer active and an account number needs to be updated). For example, upon receipt of an inactive account failed attempt message, the transfer processing circuit 208 communicates the failed attempt to the deposit processing circuit 206, which then completes the deposit of funds into the account held at the first financial institution 102 by reflecting the deposit amount in the balance of the account and/or marking the funds as available for spending. In this way, the funds will be available to the user in the account at the first financial institution 102. In more temporary situations, for example, upon an indication that the transfer was not successful due to network connectivity issues, the transfer processing circuit 208 communicates a message to the deposit processing circuit 206 indicating that the transfer processing circuit 208 is attempting the funds transfer again. In this case, the deposit processing circuit 206 may take no action until receiving a further indication that another failed attempt message was received by the transfer processing circuit 208. In some arrangements, after multiple failed attempts at transfer (e.g., three or more attempts), the funds are deposited into the account at the first financial institution 102. In other arrangements, the funds are not deposited and the transaction log associated with the account is updated to reflect no indication of the deposit.

The transfer processing circuit 208 communicates the confirmation and failed attempt messages to the display circuit 212 for display at the ATM 106. The confirmation message may include a time stamp, a second financial institution name, an account number, a confirmation number, etc., and a failed attempt message may include a reason for a failed deposit attempt. In some arrangements, upon receipt of a failed attempt message, the transaction processing circuit 208 communicates with the display circuit 212 to generate and transmit a message to the ATM 106 to display a prompt to the user. The prompt may include a list of options for the funds. For example, the prompt can include an option to deposit the funds into an account at the first financial institution 102 and an option to receive the funds back and not make any deposit.

The display circuit 212 is structured to generate and provide a message to the ATM 106 to display one or more sets of transaction information via the display 120, including a deposit confirmation message from the transfer messaging circuit 210. In some arrangements, the display circuit 212 is also structured to generate and provide a message to the ATM 106 regarding account details including account balances, account numbers, etc. The display circuit 212 is further configured to display a processing screen while the deposit is being transferred to the second financial institution 152. In this regard, the display circuit 206 is communicably and operatively coupled to the transfer messaging circuit 210 and the deposit processing circuit 206.

The display circuit 212 is configured to create, generate, establish, update, and maintain a transaction status and/or transaction history list and any information associated therewith. In one embodiment, the display circuit 212 includes communication circuitry for facilitating the exchange of information between and among the display circuit 212 and any other circuitry or logic. In another embodiment, the display circuit 212 includes any combination of machine-readable media and communication circuitry. In further embodiments, the display includes a transaction processing status, wherein a user may observe the display for transaction status information associated with a deposit of fund to the second financial institution 152. Information included in the status may include, but is not limited to, the account number to which the funds are being deposited, the name of the second financial institution 152, and the completion status (e.g., "Funds Deposited," "Processing," "Awaiting Confirmation," etc.).

Figure 4:
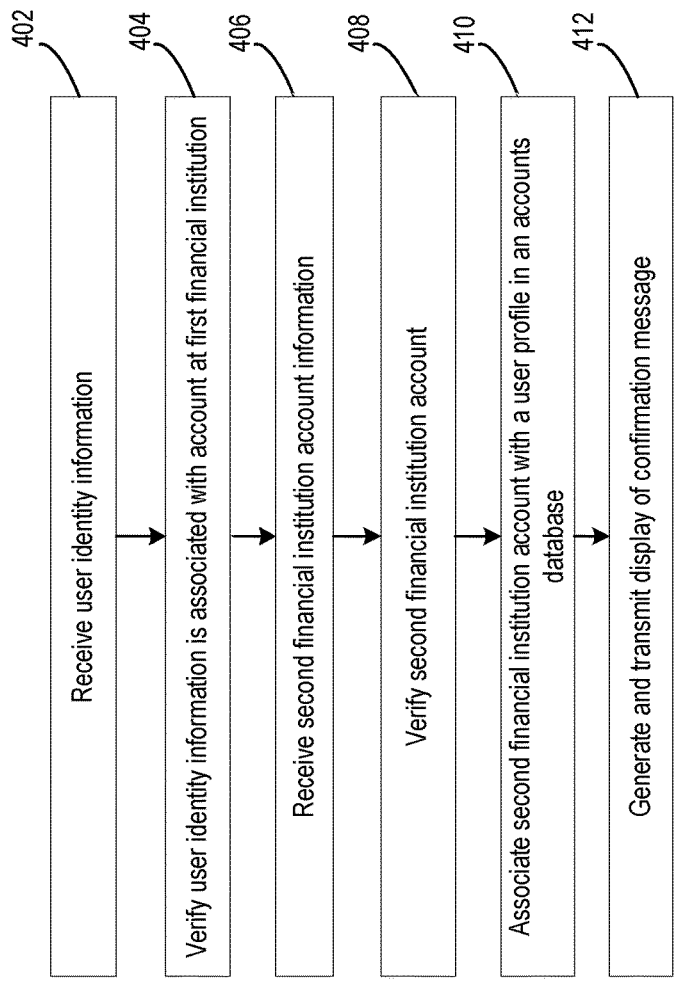
FIG. 4 is a flow diagram of an account registration method using the system of FIGS. 1-3, according to an example embodiment.

Referring now to FIG. 4, an example method is depicted. Method 400 may be implemented by the deposit management system 148 of the financial institution computing system 104 (as shown in FIGS. 1-3) to register accounts for use with the system 148, such that reference may be made to one or more components of FIGS. 1-3 in explaining method 400.

User identity information is received at 402. The user identity information is received by the account registration circuit 202. In some arrangements, the user identify information is received when the user logs into the client application 178. For example, when logging into the client application 178, the user may provide a username and password, which is received by the account registration circuit 202. In other arrangements, the user can use the ATM 106 to register accounts and may input a transaction card. In such arrangements, the user may also provide a PIN to the ATM 106 to authenticate the user as being associated with the transaction card. When the transaction card is read by the card reader 128, the ATM 106 transmits the transaction card information (e.g., debit card number, credit card number, etc.) and the PIN to the account registration circuit 202 for verification.

User identity information is verified to be associated with an account at the first financial institution at 404. The user identity information is verified by the registration circuit 202 through use of the accounts database 142. The registration circuit 202 searches the accounts database 142 for the received user identity information. The registration circuit 202 retrieves a user profile associated with the user identity information, including user account information of accounts held by the first financial institution 102. For example, the user may hold a checking account at the first financial institution 102 and a username and password or transaction card information is associated with the checking account in a user profile stored in the accounts database 142. As such, when the registration circuit 202 searches the account database 142, the user profile including all associated information is accessed.

Second financial institution account information is received at 406. The second financial institution account information is received by the account registration circuit 202. For example, the user enters the account number and routing number for the payee account to be registered. In another example, the user scans a check and/or savings deposit slip associated with the account to be registered and captures the account information, which may be directly entered into the client application 178 for verification.

The account with the second financial institution is verified at 408. The account registration circuit 202 transmits a message to the second financial institution 152 requesting verification of the account information. In other arrangements, the account can be verified by an attempt to transfer a nominal amount of funds (e.g., $0.01) to the second financial institution 152. In this case, the account registration circuit 202 communicates with the transfer processing circuit 208 to perform a nominal funds transfer to the second financial institution account. If the transfer is successful, the transfer processing circuit 208 receives a confirmation message indicating the transfer was processed (e.g., via the inter-FI transfer system 150) and communicates the confirmation message to the account registration circuit 202 to verify the account.

The second financial institution account is associated with a user profile at 410. The account registration circuit 202 associates the account information with a stored user profile in the accounts database 142. As such, the account information, including the account number, routing number, second financial institution name, etc., can be stored in the user profile.

A confirmation display is generated and transmitted at 412. In instances where the account is successfully registered, a confirmation message is generated by the account registration circuit 202, which communicates with the display circuit 212 to transmit the confirmation message for display on the user device 170 and/or the ATM 106. In one arrangement, if the user is completing the registration via the client application 178 on the user device 170, the display circuit 212 transmits the confirmation to the user device 170 for display. In another arrangement, if the user is completing the registration via the ATM 106, the display circuit 212 transmits the confirmation to the ATM 106 for display. The confirmation message can include the account information of both the first financial institution account and the second financial institution account, a confirmation number, etc. In cases of unsuccessful registration, the message may include a reason for the unsuccessful attempt. For example, the message may indicate that the account number and/or routing number information was not verified with the second financial institution 152. In instances of unsuccessful registration attempts, process 400 skips over process 410 such that no accounts are associated with accounts held at the first financial institution 102.

Figure 5:
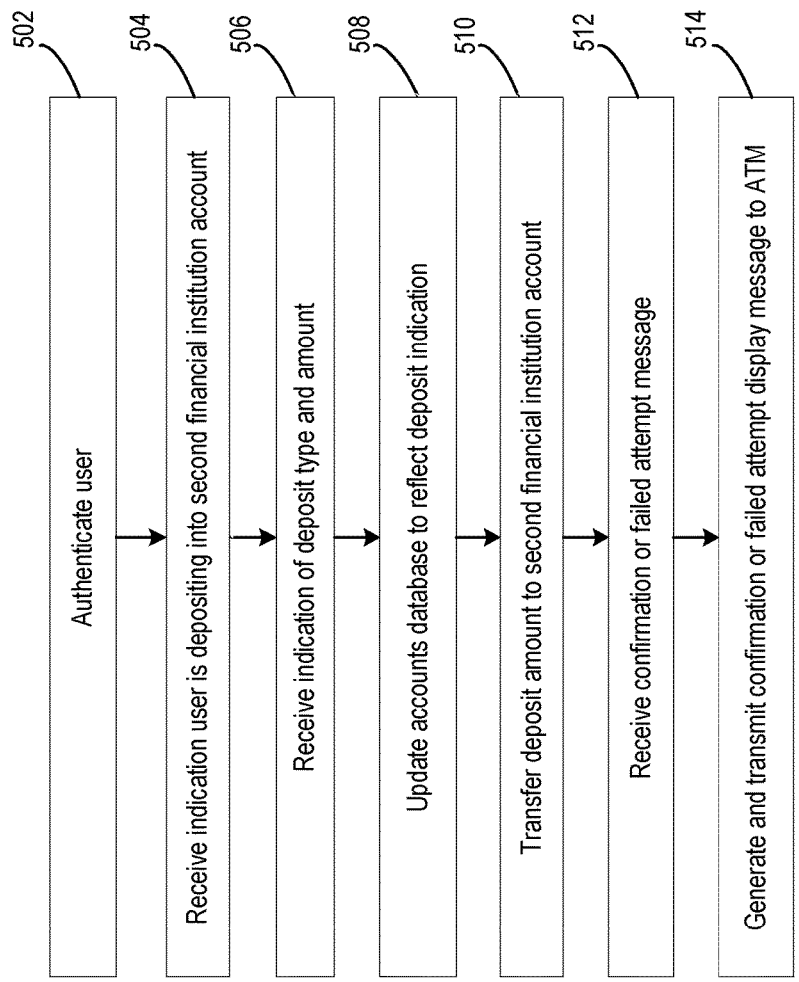
FIG. 5 is a flow diagram of an inter-FI deposit method using the system of FIGS. 1-3, according to an example embodiment.

Referring now to FIG. 5, an example method is depicted. Method 500 may be implemented by the deposit management system 148 of the first financial institution computing system 104 (as shown in FIGS. 1-3) to complete a deposit into a second financial institution account using the system 148, such that reference may be made to one or more components of FIGS. 1-3 in explaining method 500.

The user is authenticated at 502. The user is authenticated by the authentication circuit 204 for use of the ATM 106. The user enters authentication information at the ATM 106, which is transmitted to the authentication circuit 204 for authentication. The authentication circuit 204 receives transaction card information from the card reader 128 of the ATM 106, generates and transmits an authentication prompt to the ATM 106, and receives a user authentication (e.g., PIN) from the ATM 106. The authentication circuit 204 uses the received user authentication to authenticate the user. The authentication circuit 204 retrieves a user profile from the accounts database 142 and compares the user profile information to the received user authentication. For example, the authentication circuit 204 receives the transaction card information (e.g., debit card number, credit card number), retrieves the user profile related to the transaction card information from the accounts database 142, and uses the user profile to compare a PIN input by the user at the ATM 106 to a PIN associated with the transaction card in the accounts database 142. If the entered PIN matches the stored PIN, the user is authenticated. As a further example, the user may be authenticated using facial recognition, voice recognition, and/or other biometrics via a camera and/or microphone at the ATM 106.

An indication that the user is depositing into a second financial institution account is received at 504. Upon authentication of the user, the ATM 106 may display a series of screens to the user (described further herein with regard to FIGS. 6 and 7). For example, the initial screen may display transaction options to the user, such as cash withdrawal, cash deposit, check deposit, check balances, etc. The user may select to deposit cash and a second screen may include account options, including the option to deposit cash into an account at the first financial institution 102 or into an account at the second financial institution 152. If the user selects to deposit into an account at the second financial institution 152, a message is sent to the deposit processing circuit 206 to complete the deposit.

An indication of the deposit type and amount is received at 506. The deposit mechanism 130 is structured to receive cash and/or checks from a user interacting with the ATM 106, determine the deposit amount, determine the payor/payee of funds if receiving a check, and transmit the deposit type, amount, and other deposit information to the first financial institution computing system 104. In some arrangements, the deposit mechanism 130 includes a counting device to count the number of bills and/or checks being deposited. In some arrangements, the deposit mechanism 130 also includes a scanner to verify the legitimacy of deposited cash and checks and to scan an image of a check to identify the payor/payee information, the amount of deposit, etc. The deposit mechanism 130 can store the scanned image in the accounts database 142 for later access by the first financial institution computing system 104. In some arrangement, the deposit mechanism 130 communicates the scanned image, deposit amount, type (e.g., check or cash), and payor/payee details to the display 120 of the ATM 106 such that the information is displayed to the user on the ATM 106 for confirmation.

The accounts database is updated to reflect a deposit transaction at 508. The deposit processing circuit 206 receives an indication from the deposit mechanism 130 reflecting the amount and type of deposit. In some instances, the deposit processing circuit 206 may update the user account in the accounts database 142 at the first financial institution 102 to reflect the deposit amount. In one arrangement, once the deposit processing circuit 206 receives the deposit indication, the deposit processing circuit 206 deposits the funds into the account held at the financial institution 102 and updates the balance of the account to reflect the deposit. For example, the user deposits a check for $150 into the ATM 106 and indicates that the check is to be deposited into a savings account held at the second financial institution 152. After the check is verified, the deposit processing circuit 206 receives the deposit information and updates the account at the first financial institution 102 to reflect the deposit both in the transaction log of the account and in the account balance. The deposit processing circuit 206 may receive an image of the scanned check and can upload the image to the transaction log for reference of the user. In some instances, the deposit processing circuit 206 updates the account balance to include a note that the $150 is not available for spending, but is merely a pending amount. In other arrangements, the deposit processing circuit only updates the transaction log of the account to show a deposit transaction is occurring, but does not make the funds available for spending.

The deposit amount is transferred to a registered second financial institution account at 510. The transfer processing circuit 208 is configured to initiate a funds transfer to a registered account at the second financial institution 152. The transfer processing circuit 208 receives deposit information from the deposit processing circuit 206 and communicates with the inter-FI transfer system 150 (or other clearing system) to complete the funds transfer. The transfer processing circuit 208 communicates the payee account number and routing number to the inter-FI transfer system 150 to complete the transfer. The inter-FI transfer system 150 can then process the funds transfer to the second financial institution 152 (e.g., check the available funds at the first financial institution 102 and clear the funds for transfer to the second financial institution 152).

A confirmation or failed attempt message is received at 512. The transfer processing circuit 208 receives a confirmation or failed attempt message from the second financial institution 152 and/or the inter-FI transfer system 150 indicating the completion of or unsuccessful attempt at a funds transfer. A failed attempt message may include a reason for the unsuccessful attempt (e.g., payee account no longer active, network connectivity issues, etc.). In some arrangements, when the transfer processing circuit 208 receives a failed attempt message indicating a permanent situation that is likely not solvable with another transfer attempt, the transfer processing circuit 208 communicates the failed attempt to the deposit processing circuit 206, which then completes the deposit of funds into the account held at the first financial institution 102 by reflecting the deposit amount in the balance of the account and/or marking the funds as available for spending. As such, the funds are available to the user in the account at the first financial institution 102 even though the transfer was not successful. In more temporary situations, for example, upon an indication that the transfer was not successful due to network connectivity issues, the transfer processing circuit 208 communicates a message to the deposit processing circuit 206 indicating that the transfer processing circuit 208 is attempting the funds transfer again. In this case, the deposit processing circuit 206 may take no action until receiving a further indication that another failed attempt message was received by the transfer processing circuit 208. In some arrangements, after multiple failed attempts at transfer (e.g., three or more attempts), the funds are deposited into the account at the first financial institution 102. In other arrangements, the funds are not deposited and the transaction log associated with the account is updated to reflect no indication of the deposit.

A confirmation or failed attempt display is generated and transmitted at 514. The transfer processing circuit 208 communicates the confirmation and failed attempt messages to the display circuit 212 for display at the ATM 106 via the display 120. The confirmation message may include a second financial institution name, an account number, a confirmation number, etc., and a failed attempt message may include a reason for a failed deposit attempt, etc. In some arrangements, upon receipt of a failed attempt message, the transaction processing circuit 208 communicates with the display circuit 212 to generate and transmit a message to the ATM 106 to display a prompt to the user. The prompt may include a list of options for the funds. For example, the prompt can include an option to deposit the funds into an account at the financial institution 102 and an option to receive the funds back and not make any deposit.

Figure 6:
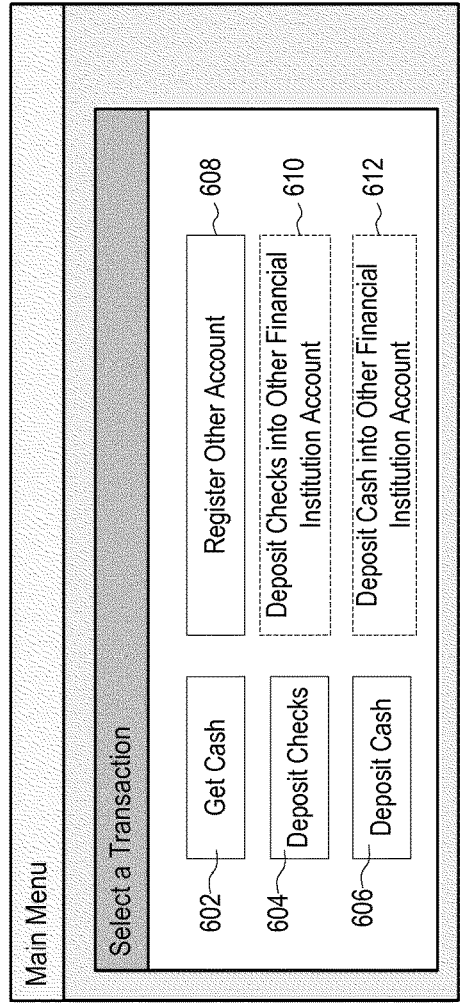
FIG. 6 is an ATM user interface using the system of FIGS. 1-3, according to an example embodiment.
Figure 7:
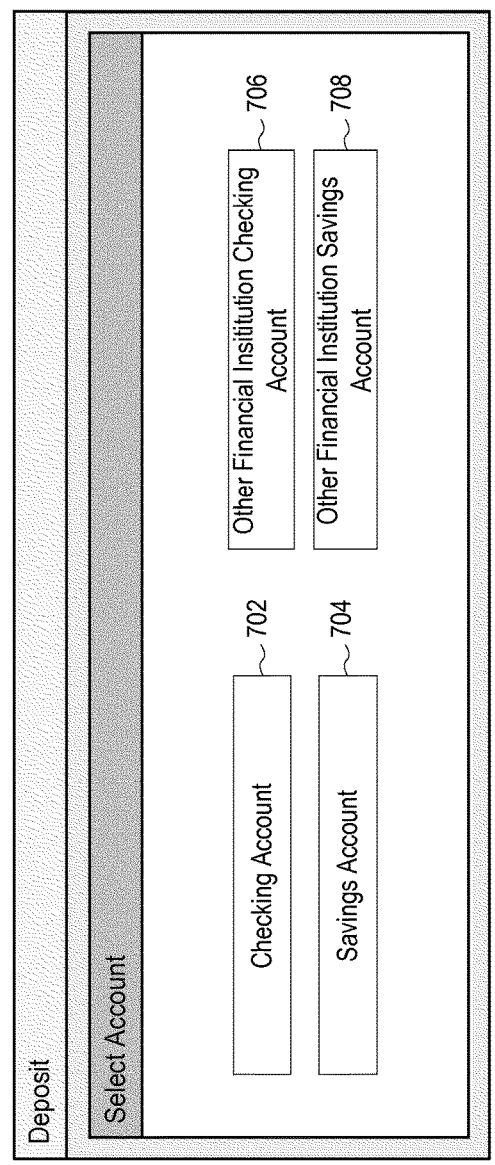
FIG. 7 is an ATM user interface using the system of FIGS. 1-3, according to an example embodiment.

Referring now to FIGS. 6-7, example user interfaces 600 and 700 of the ATM 106 of the financial institution 102 are shown, according to an example embodiment.

Referring now to FIG. 6, an example user interface 600 showing an initial ATM screen is shown, according to an example embodiment. The user interface 600 is an example user interface that can be presented to a user via the ATM 106 associated with the financial institution 102. The user interface 600 prompts a user with transaction options. In some arrangements, the transaction options can include "Get Cash" 602, "Deposit Checks" 604, "Deposit Cash" 606, and "Register Other Account" 608. In other arrangements, as shown, the transaction options can further include "Deposit Checks into Other Financial Institution Account" 610 and "Deposit Cash into Other Financial Institution Account" 612. In instances where these selections are not presented on the initial screen (e.g., user interface 600), they can be presented on the second screen (e.g., user interface 700) as shown in FIG. 7.

If the user has not yet registered a second financial institution account with the system 148, the user may select the "Register Other Account" option 608 to complete a registration process as detailed in process 400 shown in FIG. 4. If the user has completed a registration process for one or more other financial institution accounts, the user may wish to deposit cash and/or checks into a savings account at the second financial institution 152. For example, the user may select "Deposit Checks into Other Financial Institution Account" 610 on the initial screen or "Other Financial Institution Savings Account" 708 on the second screen and complete the deposit process as described above with regard to process 500 shown in FIG. 5.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, the system comprising:
    an automated teller machine (ATM) comprising a near-field communication (NFC) transceiver, configured to:
        detect that a chip is proximate to the NFC transceiver; and
        transmit a signal including information received from the chip; and
    a first institution computing system associated with a first institution, the first institution computing system including a processing circuit comprising a processor and memory, the memory structured to store instructions that are executable by the processor and cause the processing circuit to:
        extract, from the signal transmitted by the ATM, information associated with a user, wherein the user holds a first account at the first institution and a second account at a second institution, wherein the first institution is different than the second institution;
        retrieve, based on the information, a user identification associated with the user;
        generate a message comprising a request to register the second account at a second institution computing system of the second institution using second account information associated with the second institution;
        generate an encrypted message from the message based on a cryptography technique;
        transmit, via a network interface, the encrypted message to the second institution computing system of the second institution;
        associate a registered second account with a stored user profile in an accounts database held at the first institution;
        authenticate the user using the user identification, wherein the user identification is compared to the stored user profile;
        receive, from the ATM, a selection option indicating that cash deposited into the ATM, or a check deposited into the ATM, is to be deposited into the registered second account at the second institution;

initiate, via an inter-financial institution transfer, a funds transfer from the first institution computing system to the registered second account at the second institution computing system upon receiving the selection option;

receive from the second institution computing system, a failed attempt message indicating a reason for failure;

determine, from the failed attempt message, that the reason indicates the funds transfer failed due to network connectivity issues or due to one of (i) an inactive payee account or (ii) an expired payee account number;

responsive to determining that the reason indicates the network connectivity issues:
  determine that the reason that the funds transfer is unsuccessful is a temporary situation and not a permanent situation;
  re-initiate the funds transfer to the registered second account at the second institution; and
  transmit, to a display, the failed attempt message and a first confirmation of re-transfer, to the user via a user interface of the ATM; or responsive to determining that the reason indicates one of the inactive payee account or the expired payee account number:
  determine that the reason for failure is the permanent situation and not the temporary situation;
  initiate the funds transfer to the first account instead of the registered second account; and
  transmit, to the display, the failed attempt message and a second confirmation of the transfer of funds to the first account, to the user via the user interface of the ATM.

2. The first institution computing system of claim 1, wherein the processing circuit is further configured to:
  generate a confirmation that the funds were transferred to the first account instead of the registered second account; and
  transmit the confirmation to the ATM.

3. The first institution computing system of claim 1, wherein the processing circuit is further configured to:
  register the second account with the first institution, wherein registering the second account comprises:
    receiving the second account information, wherein the second account information comprises a second account number and a second routing number; and
    verifying the second account information and transmitting a verification message to the second institution computing system.

4. The first institution computing system of claim 3, wherein the processing circuit is further configured to generate a registration confirmation, and transmit the registration confirmation to the ATM.

5. A method, comprising:
  detecting, by an automated teller machine (ATM) comprising a near-field communication (NFC) transceiver, that a chip is proximate to the NFC transceiver;
  transmitting, by the ATM, a signal including information received from the chip;
  extracting, by a first institution computing system, information associated with a user, wherein the user holds a first account at a first institution and a second account at a second institution;
  retrieving, by the first institution computing system, based on the information, a user identification associated with the user;
  generating, by the first institution computing system, a message comprising a request to register the second account at a second institution computing system of the second institution using second account information associated with the second institution;
  generate, by the first institution computing system, an encrypted message from the message based on a cryptography technique;
  transmitting, by the first institution computing system, via a network interface, the encrypted message to the second institution computing system of the second institution;
  associating, by the first institution computing system, a registered second account with a stored user profile in an accounts database held at the first institution;
  authenticating, by the first institution computing system, the user using the user identification, wherein the user identification is compared to the stored user profile in an accounts database of the first institution computing system;
  receiving, by the first institution computing system, from the ATM, a selection option indicating that cash deposited into the ATM or a check deposited into the ATM is to be deposited into the second account;
  initiating, by the first institution computing system, via an inter-financial institution transfer, a funds transfer to the second account upon receiving, from the ATM, the selection option;
  receiving, by the first institution computing system, from the second institution computing system, a failed attempt message indicating a reason for failure;
  determining, by the first institution computing system, from the failed attempt message, that the reason indicates the funds transfer failed due to network connectivity issues or due to one of (i) an inactive payee account or (ii) an expired payee account number;
  responsive to determining that the reason indicates the network connectivity issues:
    determining, by the first institution computing system, that the reason that the funds transfer is unsuccessful is a temporary situation and not a permanent situation;
    re-initiating, by the first institution computing system, the funds transfer to the registered second account at the second institution computing system; and
    transmitting, by the first institution computing system, to a display, the failed attempt message and a first confirmation of re-transfer, to the user via a user interface of the ATM; or
  responsive to determining that the reason indicates one of the inactive payee account or the expired payee account number:
    determining, by the first institution computing system, that the reason for failure is the permanent situation and not the temporary situation;
    initiating by the first institution computing system, the funds transfer to the first account instead of the registered second account; and
    transmitting, by the first institution computing system, to the display, the failed attempt message and a second confirmation of the transfer of funds to the first account, to the user via the user interface of the ATM.

6. The method of claim 5, further comprising:
  generating, by the first institution computing system, a confirmation that the funds were transferred to the first account instead of the registered second account; and transmitting, by the first institution computing system, the confirmation to the ATM.

7. The method of claim 5, further comprising:
registering, by the first institution computing system, the second account with the first institution, wherein registering the second account comprises:
receiving, by the first institution computing system, the second account information, wherein the second account information includes a second account number and a second routing number; and
verifying, by the first institution computing system, the second account information and transmitting a verification message to the second institution computing system.

8. The method of claim 5, further comprising generating a registration confirmation, and transmitting, by the first institution computing system, the registration confirmation to the ATM.

9. The system of claim 1, wherein in response to determining that the reason for failure is the permanent situation and not the temporary situation further comprises:
receive, from the ATM, a personal identification number associated with the user identification;
receive, from a camera of the ATM, an image associated with the user identification;
receive, from a microphone of the ATM, audio associated with the user identification; and
receive, from the camera and the microphone of the ATM, biometrics associated with the user identification.

10. The system of claim 9, wherein the stored user profile includes an authenticated personal identification number, an authenticated image, authenticated audio, and authenticated biometrics.

11. The system of claim 10, wherein the processing circuit is further configured to authenticate the user by determining a match between the personal identification number, the image, the audio, and the biometrics with the authenticated personal identification number, the authenticated image, the authenticated audio, and the authenticated biometrics.

12. The system of claim 11, wherein the processing circuit is further configured to:
in response to authenticating the user, display, an initial screen having one or more user selectable transaction options;
in response to receiving a first user selection of one or more selectable transaction options, display a second a second screen having a first user selectable deposit option to transfer the funds to the first account and a second user selectable deposit option to transfer the funds to the second account; and in response to receiving a second user selection of the second user selectable deposit option, transmit a completion message to complete a transfer of the funds to the first account.

13. The method of claim 5, wherein associating the registered second account comprises associating, by the first institution computing system, the registered second account with the stored user profile in an accounts database held at the first institution computing system, the stored user profile including an authenticated personal identification number, an authenticated image, authenticated audio, and authenticated biometrics.

14. The method of claim 13, wherein in response to determining that the reason for failure is the permanent situation and not the temporary situation further comprises:
receiving, by the first institution computing system, from the ATM, a personal identification number associated with the user identification;
receiving, by the first institution computing system, from a camera of the ATM, an image associated with the user identification;
receiving, by the first institution computing system, from a microphone of the ATM, audio associated with the user identification;
receiving, by the first institution computing system, from the camera and the microphone of the ATM, biometrics associated with the user identification;
authenticating, by the first institution computing system, the user by determining a match between the personal identification number, the image, the audio, and the biometrics with the authenticated personal identification number, the authenticated image, the authenticated audio, and the authenticated biometrics;
in response to authenticating the user, displaying, by the first institution computing system, an initial screen having one or more user selectable transaction options;
in response to receiving a first user selection of the one or more selectable transaction options, displaying, by the first institution computing system, a second a second screen having a first user selectable deposit option to transfer the funds to the first account and a second user selectable deposit option to transfer the funds to the second account; and
in response to receiving a second user selection of the second user selectable deposit option, transmitting, by the first institution computing system, a message to complete a transfer of the funds to the first account.

* * * * *